United States Patent [19]

Matheson

[11] 4,440,193

[45] Apr. 3, 1984

[54] VALVE ASSEMBLY

[75] Inventor: Charles L. Matheson, Cookeville, Tenn.

[73] Assignee: Cummins Engine Company, Inc., Columbus, Ind.

[21] Appl. No.: 323,940

[22] Filed: Nov. 23, 1981

[51] Int. Cl.³ .................. F16K 37/00; F16K 24/02
[52] U.S. Cl. ................................ 137/558; 137/588; 116/109; 222/521; 340/620
[58] Field of Search ................... 137/588, 558; 222/481.5, 484, 521; 340/620; 116/109

[56] References Cited

U.S. PATENT DOCUMENTS

| 754,618 | 5/1904 | Smith et al. | 137/588 |
|---|---|---|---|
| 922,198 | 5/1909 | Saunders | 222/484 |
| 2,046,474 | 7/1936 | Maggenti | 137/588 |
| 2,173,662 | 9/1939 | Plattring et al. | 222/484 |
| 2,197,352 | 4/1940 | Terkel | 137/588 |
| 2,264,671 | 12/1941 | Kocher | 137/588 |
| 2,333,310 | 11/1943 | Greening | 137/588 |
| 2,362,379 | 11/1944 | Holveck | 222/521 |
| 2,405,681 | 8/1946 | Woock | 137/588 |
| 2,661,018 | 12/1953 | Snyder | 137/588 |
| 2,702,563 | 2/1955 | Snyder et al. | 137/588 |
| 2,790,582 | 4/1957 | Halpern | 222/484 |
| 2,810,398 | 10/1957 | Carlson | 137/588 |
| 2,939,611 | 6/1960 | Nebinger | 222/484 |
| 2,992,762 | 7/1961 | Foreman | 222/484 |
| 3,265,101 | 8/1966 | Shiozaki et al. | 137/588 |
| 3,419,054 | 12/1968 | Tashiro | 137/588 |
| 3,727,638 | 4/1973 | Zaremba, Jr. et al. | 137/572 |
| 4,025,048 | 5/1977 | Tibbitts | 137/572 X |

Primary Examiner—Alan Cohan
Assistant Examiner—John A. Rivell
Attorney, Agent, or Firm—Neuman, Williams, Anderson & Olson

[57] ABSTRACT

A valve assembly is provided for controlled draining of a liquid accumulated in a closed vessel. The assembly includes a body member mounted on the vessel and a valve piece adjustably mounted on the body member for movement between open and closed positions. The body member has a first section extending into the vessel interior wherein the liquid accumulates, a second section secured to the vessel, and a substantially exposed third section. The first, second, and third sections are provided with a common primary passage and an independent common secondary passage. Each passage has one end terminating within the vessel interior and a second end terminating externally of the vessel. The body member first section is provided with a stationary valve seat disposed in aligned and spaced relation with respect to the primary passage one end. The valve piece includes an elongated first element slidably and sealingly mounted within the primary passage. A longitudinally extending bore open at opposite ends is formed in the first section. One end of the bore engages the valve seat and is closed thereby when the valve piece is in a closed position. An exposed flange element encompasses the exterior of the first element and is connected thereto. The flange element is provided with a seal means which sealingly engages and closes off an end of the secondary passage except when the valve piece is in the open position. The seal means effects a predetermined delay in opening the secondary passage relative to the unsealing of the bore end with respect to the valve seat.

8 Claims, 11 Drawing Figures

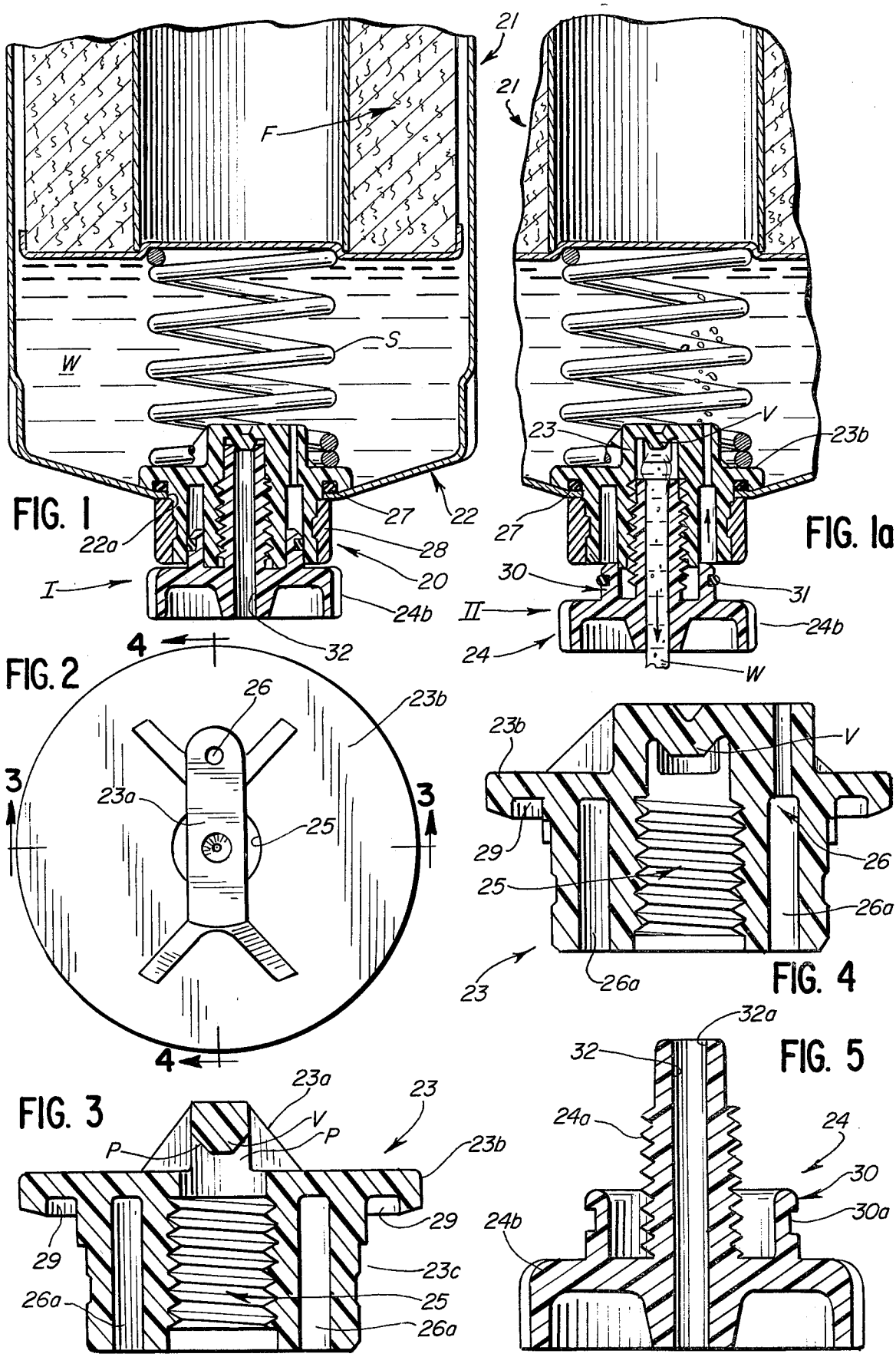

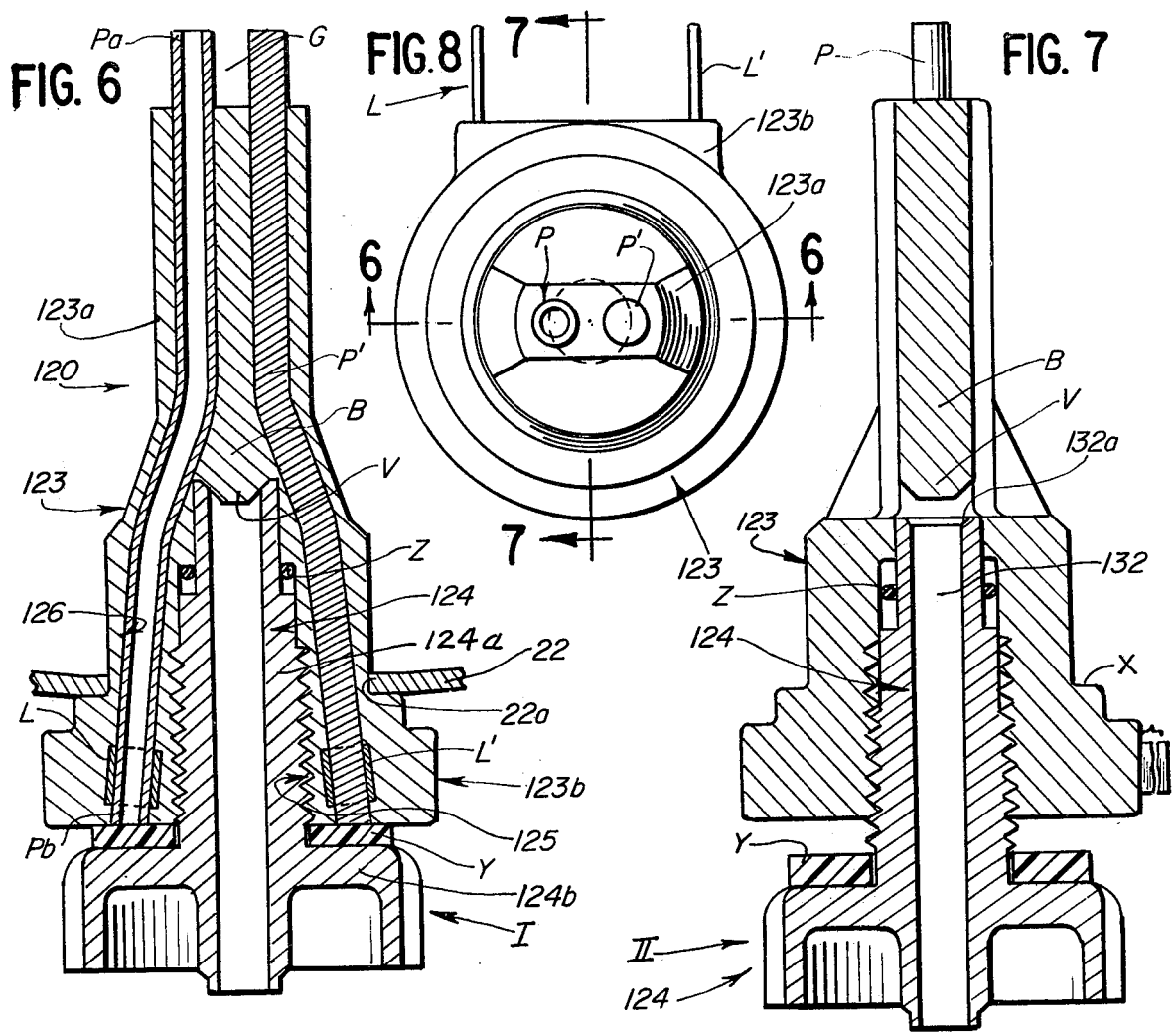

VALVE ASSEMBLY

BACKGROUND OF THE INVENTION

Various valve assemblies have heretofore been provided for draining a liquid which has accumulated in a closed vessel (e.g. fuel/water separator). Controlled drainage of the accumulated liquid, such as water, oftentimes presents a problem because of a vacuum environment which exists within the vessel interior. Such prior valve assemblies utilized for this purpose have been beset with one or more of the following shortcomings: (a) the assembly was of complex and costly construction; (b) the assembly required an inordinate amount of service and maintenance; (c) the assembly was bulky and awkward to manipulate; (d) the assembly was ineffective in providing controlled drainage of the accumulated liquid; and (e) the assembly was difficult to install on the vessel and replacement of the various components thereof was a costly and time-consuming operation.

SUMMARY OF THE INVENTION

Thus, it is an object of the invention to provide an improved valve assembly of the type described which avoids the aforenoted shortcomings.

It is a further object of the invention to provide a valve assembly of the type described which embodies a minimal number of component parts.

Further and additional objects will appear from the description, accompanying drawings, and appended claims.

In accordance with one embodiment of the invention a valve assembly is provided for the controlled draining of a liquid which has accumulated in a closed vessel wherein the interior of the vessel is in a vacuum environment. The assembly includes a body member, which is mounted on the vessel, and a valve piece which is mounted on the body member for selective movement between open and closed positions. The body member is provided with a first section which extends into the portion of the vessel interior in which the liquid accumulates. A second section of the body member is connected to the first section and is adapted to be secured to the vessel. The body member also includes a third section which extends from the second section and is disposed adjacent the exterior of the vessel. The first, second and third sections of the body member are provided with a common primary passage and a common secondary passage. The passages are independent of one another and open at opposite ends. One end of each passage terminates within the vessel interior with the one end of the secondary passage being elevated relative to the one end of the primary passage. The opposite or second ends of both passages communicate with the exterior of the vessel. The valve piece is provided with an elongated first element which is in adjustable sealing engagement within the primary passage. A flange encompasses the first element and is disposed on the exterior of the vessel. A seal element is mounted on the flange and is adapted to close off the exposed end of the secondary passage except when the valve piece is in the open position. The first element of the valve piece is provided with a longitudinal bore having one end thereof adapted to communicate with the vessel interior when the valve piece is in an open position. The bore one end is adapted to engage and be shut off by a valve seat carried by the body member first section when the valve piece is in a closed position. The disengagement of the seal piece from the end of the secondary passage occurs subsequent to the disengagement of the bore end from the valve seat and after the latter has moved a predetermined distance from the valve seat. The relative cross-sectional dimensions of the bore and secondary passage are such that only a gaseous fluid will flow into the vessel interior through the secondary passage when the valve piece is in an open position and none of the accumulated liquid will exit from the vessel interior through the secondary passage.

DESCRIPTION

For a more complete understanding of the invention reference should be made to the drawings wherein:

FIG. 1 is an enlarged fragmentary vertical sectional view of one embodiment of the improved valve assembly shown mounted on the lower portion of a closed vessel and with the valve piece in a fully closed position with respect to the body member.

FIG. 1a is similar to FIG. 1 but showing the valve piece in a fully open position.

FIG. 2 is an enlarged top view of the body member per se forming a component of the valve assembly shown in FIGS. 1, 1a.

FIGS. 3 and 4 are sectional views taken along lines 3—3 and 4—4, respectively, of FIG. 2.

FIG. 5 is an enlarged vertical sectional view of the valve piece per se forming a component of the valve assembly shown in FIGS. 1, 1a.

FIG. 6 is an enlarged vertical sectional view similar to FIG. 1, taken along line 6—6 of FIG. 8 and of a second embodiment of the improved valve assembly and showing the valve piece thereof in a fully closed position.

FIG. 7 is an enlarged sectional view taken along line 7—7 of FIG. 8 and showing the valve piece in a fully opened position.

FIG. 8 is a top plan view of the valve assembly of FIG. 6.

FIGS. 9 and 10 are fragmentary sectional views similar to FIGS. 6 and 7, respectively, but of a third embodiment of the improved valve assembly.

Referring now to FIGS. 1, 1a one form of the improved valve assembly 20 is shown mounted on a conventional fuel/water separator utilized on an internal combustion engine, such as a diesel engine, not shown. Separator 21, normally includes a closed vessel 22 in which is disposed a filter F through which a mixture of water, oil and other impurities is caused to flow during operation of the engine. During flow of the mixture through the filter, the water W is separated therefrom and accumulates at the bottom of vessel 22. A coil spring S may be utilized within the vessel to properly position therein the filter. The structure of a conventional separator is well known in the art and does not constitute any part of the improved valve assembly 20 to be described hereinafter. When draining the separator 21, the engine is shut down and the interior of the separator vessel is frequently in a vacuum environment thereby making discharge of the accumulated liquid W (e.g. water/fuel from the vessel extremely difficult unless the vacuum is broken.

Valve assembly 20 includes a body member 23, see FIGS. 3, 4, which is preferably of one piece construction and a valve piece 24, see FIG. 5, which is also preferably of unitary construction. The valve piece 24 is selectively movable relative to the body member between a fully closed position I (FIG. 1) and a fully opened position II (FIG. 1a).

Body member 23, as illustrated, includes a first section 23a, a second section 23b, and a third section 23c. When the body member is mounted on the vessel 22, the first section 23a is disposed within the lower interior portion of the vessel wherein the liquid accumulates. As shown in FIGS. 1, 1a the second section 23b, which includes an outwardly extending flange or shoulder, is also disposed within the vessel interior. The third section 23c extends downwardly from the second section 23b and projects outwardly through a suitable opening 22a formed at the bottom of the vessel. The opening 22a is non-circular (e.g. hexagonal) and the exterior of the third section 23c disposed within the opening has a similar configuration, thereby preventing relative turning of the body member 23 with respect to the vessel opening.

Formed in the first, second, and third sections are a common primary passage 25 and a common secondary passage 26, see FIG. 4. The upper end of each passage terminates within the lower interior portion of the vessel 22; however, the upper end of the secondary passage is at a greater elevation, thereby avoiding turbulence at the side ports P formed at the upper end of passage 25. The opposite, or lower, end of each passage terminates externally of the vessel. The passages are independent of one another. The first section 23a of the body member 23 has a bridge-like configuration and depending from the underside thereof is a valve seat V which is in spaced alignment with the upper end of primary passage 25, see FIG. 3. The valve seat V coacts with the upper end of the passage 25 to form the side ports P.

The portion of the primary passage 25 formed in the body member third section 23c is internally threaded for a purpose to be hereinafter described.

The underside of the second section flange 23b is provided with an annular groove 29 which is priximate the outer periphery of the flange and is sized to accommodate a conventional O-ring 27, see FIGS. 1, 1a. The underside of the flange intermediate the groove 29 and the outer periphery of the flange is beveled slightly so as to conform substantially to the configuration of the interior surface of the vessel bottom wall circumjacent the opening 22a. When the body member is properly mounted on the vessel, the O-ring 27 will be in sealing engagement with the interior wall surface of the vessel.

The segment 26a of the secondary passage 26 which is formed in the third section 23c of the body member 23 is an annular recess having the center of curvature thereof coaxial with the longitudinal center axis of the primary passage 25. The exterior surface of the third section 23c of body member 23 may be grooved to accommodate an annular snap ring 28 which press fits into locking engagement therewith. The ring coacts with the underside of the flange 23b to snugly sandwich therebetween the O-ring 27 and the portion of the vessel wall circumjacent the opening 22a.

Valve piece 24, as seen more clearly in FIG. 5, includes an elongated first element 24a which is adapted to be adjustably mounted within primary passage 25, see FIGS. 1, 1a. A segment of element 24a is provided with external threads which engage the internally threaded portion of the passage 25 formed in the third section 23c of the body member 23. Connected to and extending laterally from the exterior of element 24a is a flange-like second element 24b, which subtends the third section 23c of body member 23. The element 24b is disposed externally of vessel 22 and may be manually manipulated to adjust the valve piece 24 between positions I and II.

Projecting upwardly from flange element 24b is a continuous annular rib 30. The rib is in spaced encompassing relation with the externally threaded portion of element 24a and is adapted to slidably engage the annular recessed segment 26a of the secondary passage 26 formed in the body member 23. Rib 30 is provided with an external groove 30a in which is disposed a conventional O-ring 31.

The first and second elements 24a, 24b of the valve piece 24 are provided with a common bore 32 which is open at opposite ends. The upper end 32a of the bore is adapted to sealingly engage the valve seat V formed on the body member first section 23a, when the valve piece 24 assumes the fully closed position I. When the valve piece is in position I, the liquid (water) accumulated in the lower interior portion of the vessel cannot be discharged therefrom. Furthermore, the lower recessed segment 26a of the secondary passage 26 is closed off by rib 30 and O-ring 31, when the valve piece is in position I and thus, the vacuum environment which may exist within the vessel interior is not broken by air or gas passing through the passage 26 and percolating up through the accumulated liquid W.

The extent to which rib 30 and O-ring 31 project from flange element 24b is such that the secondary passage 26 is not uncovered—that is to say, the O-ring 31 is not disengaged from the recessed passage—until the upper end 32a of the first element bore 32 has moved a predetermined distance away from the valve seat V. Thus, once the valve piece first element 24a has moved away from the valve seat and before the O-ring 31 is disengaged from the recessed segment 26a of the secondary passage, the accumulated liquid will form a meniscus bulge extending into the upper end 32a of the bore. Once the recessed segment 26a is uncovered by O-ring 31, a siphoning effect will occur and the accumulated liquid will immediately flow through the side ports P and out through bore 32, and air bubbles will fill the voids in the vessel interior caused by the discharged liquid and thus, eliminate the vacuum environment which might have previously existed.

In order to cause the meniscus bulge to form at the upper end 32a of the bore, it is preferred that the internal diameter of the bore end 32a be approximately 0.175 inch. Also to prevent outflow of the accumulated liquid through the secondary passage 26, it is preferred that the internal diameter of the segment of the passage formed in the first section 23a of the body member be in the range of about 0.069 inch to about 0.090 inch.

FIGS. 6–8 show a second embodiment of the improved valve assembly 120 which is adapted to sense the level of the liquid accumulated in the lower interior portion of vessel 22. The various components of the valve assembly 120 which correspond with similar components of the valve assembly 20 will be given the same identifying number except in a 100 series. Valve assembly 120 includes a body member 123, which is secured to the underside of the vessel 22, and a valve piece 124 which is mounted on the body member and is manually movable between a fully closed position I (FIG. 6) and a fully open position II (FIG. 7).

The body member 123 includes an elongated first section 123a which extends into the vessel interior through a suitable non-circular vessel opening 22a. The first section 123a terminates at a predetermined elevation within the vessel interior. The lower end portion of the first section 123a is connected to a second section 123b which is disposed externally of the vessel 22. Section 123b is provided with an annular shoulder X which abuts and is affixed to the exterior surface of the vessel wall which is circumjacent the opening 22a.

The first and second sections 123a, 123b of the body member 123 are provided with common primary and secondary passages 125, 126, respectively. Passage 125 is similar to the previously described passage 25 and has a segment thereof internally threaded so as to accommodate the external threads formed on a portion of valve piece 124. Disposed in spaced aligned relation with the upper end of passage 125 is a valve seat V. The valve seat V depends from a bridge-like segment B formed in the upper portion of the first section 123a of the body member.

Positioned within the secondary passage 126 is a tubular electrically conductive probe P. The upper open end Pa of the probe extends beyond the upper end of the body memter first section 123a and is adapted to be in direct contact with the accumulated liquid when the latter reaches a predetermined level. The lower open end Pb of the probe P terminates externally of the vessel 22.

An electrical lead L is embedded in the second section 123b of the body member and has one end thereof connected to probe P and the opposite end is connected to a suitable electrical power source, not shown.

A rodlike second probe P' is provided in the body member 123, see FIG. 6, which is of electrically conductive material and is in spaced substantially coextensive relation with respect to probe P. The probe P' is connected to a second electrical lead L' which is embedded within the body member. Like lead L, the second lead L' is also connected to the electrical power source. In addition to the power source, a suitable alarm, not shown, is connected in a series circuit with the probes and power source and is energized when the circuit is completed.

In order for the circuit to be complete, it is necessary that the accumulated liquid, which has an electrically conductive characteristic, span the gap G between the upper exposed ends of the probes P, P'. When the alarm is energized, an operator will be on notice to manually move the valve piece to the fully open position II subsequent to the engine being shut down, thereby discharging the accumulated liquid from the interior of the vessel. If desired, the energized alarm may be connected to the valve piece so that the latter will automatically move to the fully open position subsequent to the engine being automatically shut down.

The valve piece 124 has an elongated first element 124a, a portion of which threadably engages the internal threads of the primary passage 125. The first element is provided with a central bore 132, the upper end 132a of which is in sealing engagement with the valve seat V when the valve piece 124 is in the fully closed position I. The lower exposed end of the first element 124a is connected to and encompassed by a flange-like second element 124b. Mounted on the second element is a disc-shaped seal Y which is formed of a compressible gas impervious material. When the valve piece 124 is in the closed position I, the seal Y is compressed between the underside of the body member second section 123b and the flange-like second element 124b. The thickness and compressibility of the seal Y is such that the end 132a of the bore 132 disengages the valve seat V prior to the seal Y uncovering the lower end Pb of the tubular probe P.

As in the case of valve assembly 20, the interior dimensions of the tubular probe P and the bore 132 formed in the valve piece are such that there is no liquid outflow at any time through the tubular probe P and a meniscus bulge is formed at the bore upper end 132a prior to the seal Y disengaging the end of the tubular probe.

FIGS. 9 and 10 illustrate a third embodiment of the improved valve assembly 220 which is basically of the same construction as valve assembly 20, except that a disc-shaped seal YY is substituted for the annular rib 30 and O-ring 31, and the secondary passage 226 has a substantially uniform internal dimension throughout.

In both assemblies 120 and 220 a conventional O-ring Z may be positioned within a portion of the primary passage and prevent leakage of the liquid between the first section 124a, 224a of the valve piece and the wall of the primary passage 125, 225. A similar O-ring may also be utilized in valve assembly 20, if desired.

The size and shape of the valve assembly components and the manner of securing the assembly to the vessel may vary from that shown.

Thus, an improved valve assembly has been disclosed which is of simple, inexpensive construction, is easy to install, and is easy to manipulate so as to effect controlled discharge of the accumulated liquid from the closed vessel.

I claim:

1. A valve assembly for use in controlling flow of liquid accumulated in a closed vessel through a drain port formed therein, said assembly comprising a body member for fixedly mounting on the vessel and aligned with the drain port, and a valve piece mounted on said body member for selective adjustment relative thereto between open and closed positions; said body member including a first section for extending through the drain port and into the vessel interior and the liquid accumulated therein, a second section for securing to the vessel and from which said first section extends in one direction into the vessel interior, and an exposed third section extending in an opposite direction from said second section and being adapted to project outwardly from the exterior of the vessel, said first, second, and third sections being provided with a common primary passage and a common secondary passage independent of said primary passage, one end of each passage being concealed in the vessel interior and terminating within the accumulated liquid and the opposite end of each passage being exposed and terminating externally of the vessel, said first section having a valve seat fixedly mounted in spaced relation with respect to said one end of the primary passage; said valve piece including an elongated first element mounted for sealing endwise adjustment within the primary passage of said body member and having a longitudinally extending bore formed therein and open at opposite ends, one end of said bore being concealed within said body member and the opposite end being exposed and disposed externally of the vessel, said bore one end being closed off by said valve seat when said valve piece is in said closed position, an exposed flange element disposed externally of the vessel and outwardly of the body member third section, said exposed flange encompassing an exterior portion of said first element, and an exposed, annular seal element carried by and extending from said flange element and sealingly engaging and closing off the exposed end of the secondary passage when said valve piece is in said closed position, said seal element assuming a non-sealing engagement with the end of the secondary passage subsequent to the bore end of said first element having moved a predetermined distance away from said valve seat.

2. The valve assembly of claim 1 wherein an exterior portion of the first element of said valve piece is in threaded sealing engagement with an internally threaded portion of the primary passage adjacent the exposed end thereof.

3. The valve assembly of claim 1 wherein the segment of the secondary passage formed in the third section of the body member is recessed relative to an exposed surface of said third section and has an annular configuration, said recessed segment being disposed in spaced, encompassing relation with respect to the segment of the primary passage formed in said body member third section.

4. The valve assembly of claim 3 wherein the recessed segment of the secondary passage is disposed concentrically with respect to a central longitudinal axis of said primary passage.

5. The valve assembly of claim 4 wherein the seal element includes a continuous annular rib projecting from the flange element of said valve piece, said rib being in sliding, sealing relation with the recessed segment of the secondary passage except when said valve piece assumes an open position with respect to said body member.

6. The valve assembly of claim 1 wherein the body member first section projects substantially vertically into the vessel interior and the said one end of the secondary passage is disposed within the accumulated liquid at a greater elevation than the corresponding one end of said primary passage.

7. The valve assembly of claim 1 wherein the secondary passage of the body member includes an elongated tubular first probe of electrically conductive material, one end of said probe projecting from the first section of said body member and being adapted to be exposed within the vessel interior at a predetermined level above the bottom of the vessel; a second probe of electrically conductive material projecting from the body member first section and being spaced from the first probe one end; said probes being electrically energized and connected to an alarm means, said alarm means being actuated only when the accumulated liquid within the vessel reaches the predetermined level and spans the distance between the probes projecting into the vessel interior completing the circuit of said probes and said alarm means.

8. The valve assembly of claim 6 wherein, when said valve piece is in the open position, only a gaseous fluid passes into the vessel interior through said secondary passage and percolates up through the accumulated liquid while the accumulated liquid flows out of the vessel through the elongated bore formed in the valve piece first element.

* * * * *